(12) United States Patent
Gillaspie et al.

(10) Patent No.: US 8,114,365 B2
(45) Date of Patent: *Feb. 14, 2012

(54) SILICA REMOVAL FROM PREGNANT LEACH SOLUTIONS

(75) Inventors: James D. Gillaspie, Gilbert, AZ (US); David R. Baughman, Golden, CO (US); Dennis D. Gertenbach, Lakewood, CO (US); Wayne W. Hazen, Lakewood, CO (US); George Owusu, Thornton, CO (US); John C. Wilmot, Anthem, AZ (US)

(73) Assignee: Freepoint-McMoran Corporation, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/718,796

(22) Filed: Mar. 5, 2010

(65) Prior Publication Data

US 2011/0000337 A1 Jan. 6, 2011

Related U.S. Application Data

(63) Continuation of application No. 11/857,941, filed on Sep. 19, 2007, now Pat. No. 7,691,347.

(51) Int. Cl.
*C22B 3/20* (2006.01)

(52) U.S. Cl. .............................................. 423/34; 75/330
(58) Field of Classification Search .......................... None
See application file for complete search history.

(56) References Cited

U.S. PATENT DOCUMENTS 7,691,347 B2 * 4/2010 Gillaspie et al. ................ 423/34
* cited by examiner

*Primary Examiner* — Melvin Mayes
*Assistant Examiner* — Stefanie Cohen
(74) *Attorney, Agent, or Firm* — Snell & Wilmer L.L.P.

(57) ABSTRACT

The present invention relates generally to a process for removing dissolved or colloidal silica from a pregnant leach solution ("PLS"). More particularly, an exemplary embodiment of the present invention relates to a process which mixes PLS with an acid source, preferably lean electrolyte, to induce formation of colloidal silica that can then be collected and removed. Additionally, in an exemplary embodiment of the present invention, at least one silica seeding agent is added to induce formation of colloidal silica, at least one flocculant is added to induce aggregation of the colloidal silica, and a solid-liquid separation process is utilized to remove advantageous amounts or substantially all of the colloidal silica, thereby providing relief from supersaturation of dissolved silica in the metal recovery processes.

20 Claims, 7 Drawing Sheets

RELIEF FROM SUPERSATURATION USING GALACTOSOL-CIBA-SILICA SEEDING AGENT

Note: 45 mg/L Si equilibrium concentration assumed; no PEO treatment

SILICA REMOVAL FROM PREGNANT LEACH SOLUTIONS

This application is a continuation of U.S. application Ser. No. 11/857,941, filed Sep. 19, 2007 now U.S. Pat. No. 7,691,347 and entitled "Silica Removal From Pregnant Leach Solutions," now U.S. Pat. No. 7,691,347.

FIELD OF INVENTION

The present invention relates generally to a process for removing dissolved or colloidal silica from a pregnant leach solution ("PLS"). More particularly, an exemplary embodiment of the present invention relates to a process which mixes PLS with an acid source, preferably lean electrolyte, to induce formation of colloidal silica that can then be collected and removed. Additionally, in an exemplary embodiment of the present invention, at least one silica seeding agent is added to induce formation of colloidal silica, at least one flocculant is added to induce aggregation of the colloidal silica, and a solid-liquid separation process is utilized to remove advantageous amounts or substantially all of the colloidal silica, thereby providing relief from supersaturation of dissolved silica in the metal recovery processes.

BACKGROUND OF THE INVENTION

Hydrometallurgical treatment of metal-bearing materials, such as metal ores, metal-bearing concentrates, and other metal-bearing substances, has been well established for many years. Moreover, leaching of metal-bearing materials is a fundamental process utilized to extract metals from metal-bearing materials. In general, the first step in this process is contacting the metal-bearing material with an aqueous solution containing a leaching agent which extracts the metal or metals from the metal-bearing material into solution. For example, in copper leaching operations, especially copper from copper minerals, such as chalcopyrite and chalcocite, sulfuric acid in an aqueous solution is contacted with copper-bearing ore. During the leaching process, acid in the leach solution may be consumed and various soluble components are dissolved thereby increasing the metal content of the aqueous solution. Other ions, such as iron may participate in the leaching of various minerals as these ions participate in dissolution reactions.

Additionally, under these current leaching processes, especially copper from copper sulfides such as chalcopyrite and chalcocite, large concentrations of dissolved silica are generated. This dissolved silica is gradually transformed to colloidal silica. Large amounts of this colloidal silica can agglomerate within process equipment, which may lead to inefficiencies in subsequent solvent extraction steps and low overall process yields. Additionally, this colloidal silica residue can result in impurities in the extracted metal (i.e. impurities in metal deposited during electrowinning steps).

Accordingly, a process that enables efficient metal recovery and provides relief from supersaturation of dissolved silica in pregnant leach solutions, thereby reducing silica within the metal recovery process, would be advantageous.

SUMMARY OF THE INVENTION

In general, according to exemplary embodiments of the present invention, the present invention relates generally to a process for removing dissolved or colloidal silica from a pregnant leach solution ("PLS"). More particularly, an exemplary embodiment of the present invention relates to a process which mixes PLS with an acid source, preferably lean electrolyte, to induce formation of colloidal silica that can then be collected and removed. Additionally, in an exemplary embodiment of the present invention, at least one silica seeding agent is added to induce formation of colloidal silica, at least one flocculant is added to induce aggregation of the formatted colloidal silica, and a solid-liquid separation process is utilized to remove advantageous amounts or substantially all of the colloidal silica, thereby providing relief from supersaturation of dissolved silica in the metal recovery processes.

For example, in accordance with the various embodiments of the present invention, the silica removal process can be implemented after any reactive processing (discussed in greater detail hereinbelow), resulting in enhanced silica removal and various other advantages over prior art metal recovery processes.

Additionally, in accordance with the various embodiments of the present invention, the reduction in the total dissolved silica and colloidal silica in the PLS reduces impurities in the metal value deposited on the cathode during an electrowinning step and reduces colloidal silica in any subsequent solvent extraction step.

BRIEF DESCRIPTION OF THE DRAWING

A more complete understanding of the present invention, however, may best be obtained by referring to the detailed description when considered in connection with the figures, wherein like numerals denote like elements and wherein.

DETAILED DESCRIPTION OF EXEMPLARY EMBODIMENTS

The detailed description of exemplary embodiments of the invention herein shows various exemplary embodiments and the best modes, known to the inventors at this time, of the invention are disclosed. These exemplary embodiments and modes are described in sufficient detail to enable those skilled in the art to practice the invention and are not intended to limit the scope, applicability, or configuration of the invention in any way. Additionally, all included figures are non-limiting illustrations of the exemplary embodiments and modes, which similarly are not intended to limit the scope, applicability, or configuration of the invention in any way.

Various embodiments of the present invention exhibit significant advancements over prior art processes, particularly with regard to metal recovery and process efficiency. Moreover, existing metal recovery processes that utilize a reactive process for metal recovery/solution extraction/electrowinning process sequence may, in many instances, be easily retrofitted to exploit the many commercial benefits the present invention provides.

Figure 1:
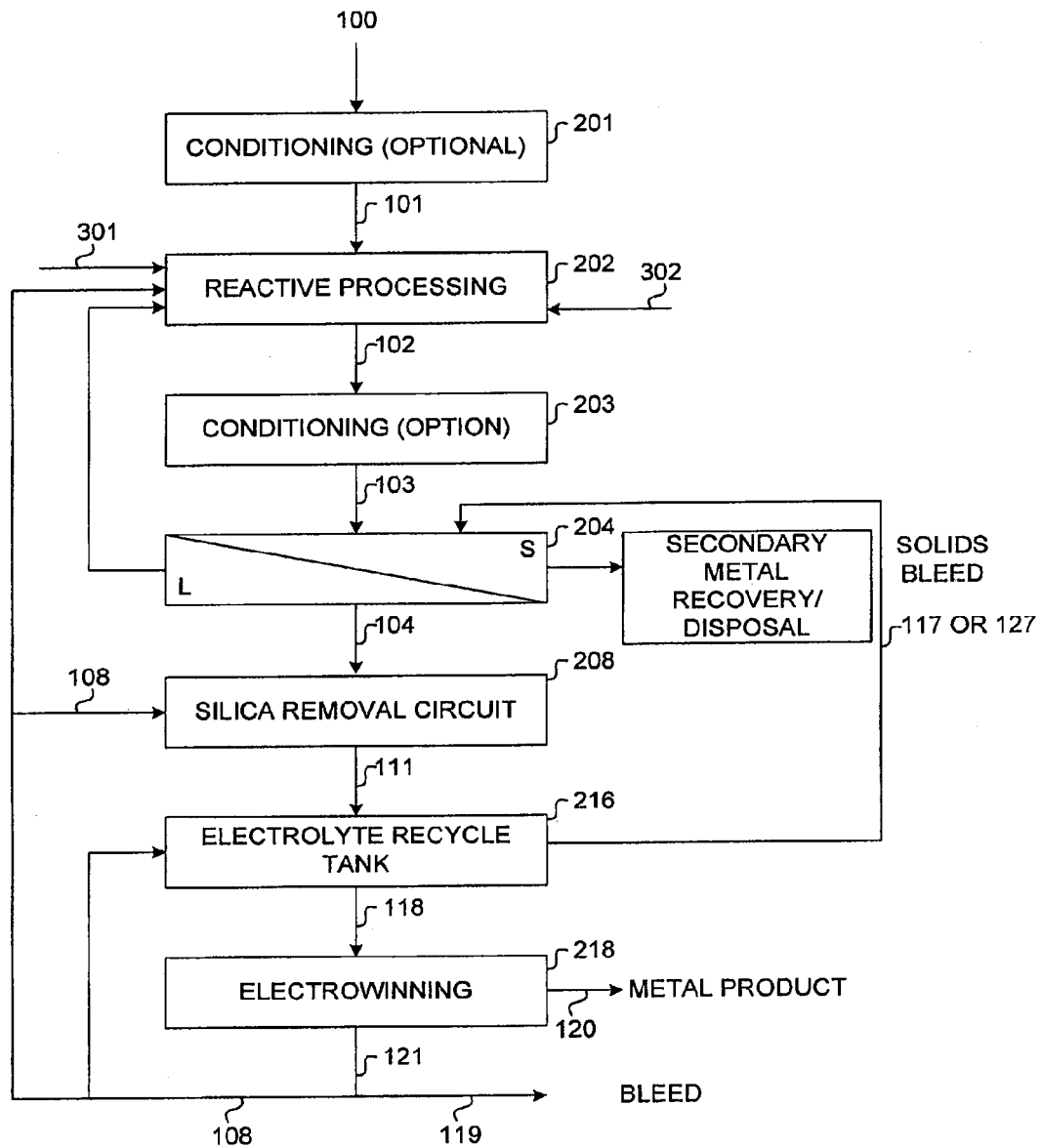
FIG. 1 illustrates an exemplary flow diagram of a metal recovery process with a silica removal circuit in accordance with one exemplary embodiment of the present invention.

Referring to FIG. 1, in accordance with various aspects of the present invention, a metal-bearing material 100 is provided for processing. Metal-bearing material 100 may be an ore, a concentrate, or any other material from which copper and/or other metal values may be recovered. Metal values such as, for example, copper, gold, silver, zinc, platinum group metals, nickel, cobalt, molybdenum, rhenium, uranium, rare earth metals, and the like, may be recovered from metal-bearing materials in accordance with various embodiments of the present invention. The various aspects and embodiments of the present invention, however, prove especially advantageous in connection with the recovery of copper from copper-bearing materials, such as, for example, ores and/or concentrates containing chalcopyrite ($CuFeS_2$), chalcocite ($Cu_2S$), bornite ($Cu_5FeS_4$), and covellite (CuS), malachite ($Cu_2CO_3(OH)_2$), pseudomalachite ($Cu_5[(OH)_2PO_4]_2$), azurite ($Cu_3(CO_3)_2(OH)_2$), chrysocolla (($Cu,Al)_2H_2Si_2O_5(OH)_4 \cdot nH_2O$), cuprite ($Cu_2O$), brochanite ($CuSO_4 \cdot 3Cu(OH)_2$), atacamite ($Cu_2[OH_3Cl]$) and other copper-bearing minerals or materials and mixtures thereof. Thus, metal-bearing material 100 preferably is a copper ore or concentrate containing at least one other metal value.

Metal-bearing material 100 may be prepared in conditioning step 201 for metal recovery processing in any manner that enables the conditions of metal-bearing material 100—such as, for example, composition and component concentration—to be suitable for the chosen reactive processing method, as such conditions may affect the overall effectiveness and efficiency of metal recovery operations. Desired composition and component concentration parameters can be achieved through a variety of chemical and/or physical processing stages, the choice of which will depend upon the operating parameters of the chosen processing scheme, equipment cost and material specifications. For example, as discussed in some detail hereinbelow, metal-bearing material 100 may undergo combination, flotation, blending, and/or slurry formation, as well as chemical and/or physical conditioning in conditioning step 201 before metal extraction.

In accordance with one aspect of the present invention, metal-bearing material 100 may optionally be prepared in a conditioning step 201, wherein conditioning step 201 may comprise controlled, fine grinding. More precisely, U.S. Pat. No. 6,676,909 describing controlled grinding is contemplated herein and the subject matter of that patent is hereby incorporated by reference. Preferably, a uniform particle size distribution is achieved. It should be understood that a variety of acceptable techniques and devices for reducing the particle size of the copper-bearing material are currently available, such as ball mills, tower mills, grinding mills, attrition mills, stirred mills, horizontal mills and the like, and additional techniques may later be developed that may achieve the desired result of reducing the particle size of the copper-bearing material to be transported.

Referring again to FIG. 1, in an exemplary embodiment of the present invention, after metal-bearing material 100 has been suitably prepared for metal recovery processing, optionally by controlled grinding, and other physical and/or chemical conditioning processes 201, including but not limited to a thickening process, it may be combined with any number of liquid feed streams, including but not limited to process water, but any suitable liquid may be employed, such as, for example, recycled raffinate, pregnant leach solution ("PLS"), lean electrolyte, and/or other recycled streams from the metal recovery processes, including but not limited to secondary metal, such as cobalt, iron, or manganese, recovery process streams, to form a metal-bearing inlet stream 101.

Moreover, in an exemplary embodiment of the present invention, after metal-bearing inlet stream 101 has been suitably prepared for metal recovery processing, it may be forwarded to a reactive processing step 202, for example, metal extraction. The reactive processing step 202 may be any suitable process or reaction that puts a metal in the metal-bearing material 100 in a condition such that it may be subjected to later metal recovery processing. For example, exemplary suitable processes include reactive processes that tend to liberate the desired metal value or values in the metal bearing material 100 from the metal-bearing material 100. In accordance with a preferred embodiment of the present invention, as described in greater detail below, reactive processing step 202 may comprise a leaching process.

Furthermore, in an exemplary embodiment of the present invention, the leaching process may comprise any leaching process suitable for extracting the metal in metal-bearing material 100 into a PLS 102. In accordance with one aspect of the present invention, the leach step comprises atmospheric leaching, pressure leaching, agitation leaching, heap leaching, stockpile leaching, pad leaching, thin-layer leaching and/or vat leaching, at either ambient or elevated temperatures. Preferably, pressure leaching is a pressure leaching process operating at a temperature in the range of about 140° C. to about 250° C. and more preferably in the range of about 150° C. to about 220° C.

In accordance with an aspect of the present invention, the optimum temperature range selected for operation will tend to maximize the extraction of copper and other metals, minimize acid consumption, and thereby minimize make-up acid requirements. That is, at higher temperatures, sulfide sulfur generally is converted to sulfate according to the following reaction:

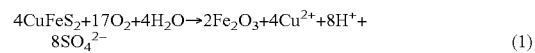
$$4CuFeS_2 + 17O_2 + 4H_2O \rightarrow 2Fe_2O_3 + 4Cu^{2+} + 8H^+ + 8SO_4^{2-} \quad (1)$$

At lower temperatures, acid is generally consumed and elemental sulfur is formed according to the following reaction:

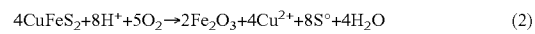
$$4CuFeS_2 + 8H^+ + 5O_2 \rightarrow 2Fe_2O_3 + 4Cu^{2+} + 8S° + 4H_2O \quad (2)$$

Thus, in accordance with one aspect of the present invention, in order to maintain preferable leaching temperature, a cooling liquid 301 may be introduced into the leaching vessel during leaching. In accordance with one aspect of this embodiment of the present invention, a cooling liquid 301 is preferably contacted with the feed stream in leaching vessel during leaching. Cooling liquid 301 may comprise any suitable cooling fluid from within the process or from an outside source, such as recycled liquid phase from the product slurry, make-up water, or a mixture of cooling fluids. Cooling liquid may be introduced into leaching vessel through the same inlet as metal-bearing inlet stream 101, or in any manner that effectuates cooling of metal-bearing inlet stream 101. The amount of cooling liquid added during leaching may vary according to the pulp density of the metal-bearing inlet stream 101, as well as other parameters of the leaching process. In an exemplary aspect of this embodiment of the invention, a sufficient amount of cooling liquid 301 is added to reactive processing step 202 to yield a solids content in product slurry 102 on the order of less than about 50% solids by weight, more preferably ranging from about 3 to about 35% solids by weight, and most preferably ranging from about 10% to about 20% solids by weight.

Moreover, in accordance with one aspect of the present invention, reactive processing step 202 may occur in any pressure leaching vessel suitably designed to contain the pressure leaching mixture at the desired temperature and pressure conditions for the requisite pressure leaching residence time. In accordance with one aspect of an exemplary embodiment of the invention, the pressure leaching vessel used in leaching step is an agitated, multi-compartment pressure leaching vessel. However, it should be appreciated that any pressure leaching vessel that suitably permits metal-bearing material 100 to be prepared for metal recovery may be utilized within the scope of the present invention.

During reactive processing step 202, copper and/or other metal values may be solubilized or otherwise liberated in preparation for later recovery processes. Any substance that assists in solubilizing the metal value, and thus releasing the metal value from a metal-bearing material, may be used. For example, where copper is the metal being recovered, an acid, such as sulfuric acid, may be contacted with the copper-bearing material such that the copper may be solubilized for later recovery steps. However, it should be appreciated that any suitable method of solubilizing metal values in preparation for later metal recovery steps may be utilized within the scope of this invention.

In accordance with one aspect of the present invention, reactive processing step 202 comprises pressure leaching, sufficient oxygen 302 is injected into a pressure leaching vessel to maintain an oxygen partial pressure from about 75 to about 750 psi, preferably from about 100 to about 400 psi, and most preferably from about 50 to about 200 psi. Furthermore, due to the nature of medium temperature pressure leaching, the total operating pressure in leaching vessel 201 is generally superatmospheric.

The residence time for the pressure leaching process can vary, depending on factors such as, for example, the characteristics of the copper-bearing material and the operating pressure and temperature of the pressure leaching vessel. In one aspect of an exemplary embodiment of the invention, the residence time for the pressure leaching ranges from about 30 to about 180 minutes, more preferably from about 60 to about 120 minutes.

Subsequent to metal-bearing material 100 undergoing reactive processing step 202, the metal values that have been made available by reactive processing step 202 undergo one or more of various conditioning steps 203. In one exemplary embodiment, the product stream 102 from leaching step 201 may be conditioned to adjust the composition, component concentrations, solids content, volume, temperature, pressure, and/or other physical and/or chemical parameters to desired values and thus to form a suitable metal-bearing solution. Generally, a properly conditioned metal-bearing solution will contain a relatively high concentration of soluble metal, for example, copper sulfate, in an acid solution and preferably will contain few impurities. Moreover, the conditions of the metal-bearing solution preferably are kept substantially constant to enhance the quality and uniformity of the copper product ultimately recovered.

In one aspect of an exemplary embodiment of the present invention, conditioning of a metal-bearing solution for metal recovery begins by adjusting certain physical parameters of the product slurry 102 from the reactive processing step 202. Optionally, in an exemplary aspect of this embodiment of the invention, wherein the reactive processing step 202 is pressure leaching, it is desirable to reduce the temperature and pressure of the product slurry, in some instances to approximately ambient conditions. An exemplary method of so adjusting the temperature and pressure characteristics of the product slurry 102 is a conditioning step 203 comprising flashing. In one aspect of an exemplary embodiment of the present invention, conditioning step 203 comprises atmospheric flashing. Further, flashed gases, solids, solutions, and steam may optionally be suitably treated, for example, by use of a Venturi scrubber wherein water may be recovered and hazardous materials may be prevented from entering the environment.

Under the current reactive and conditioning processes for metal recovery, especially copper from copper sulfides such as chalcopyrite and chalcocite, large concentrations of dissolved silica are generated. This dissolved silica is gradually transformed into colloidal silica. Large amounts of this colloidal silica can agglomerate within process equipment, which may lead to inefficiencies in subsequent solvent extraction steps and lower overall process yields. Additionally, this colloidal silica residue can result in impurities in the extracted metal (i.e. impurities in metal deposited during electrowinning steps 218).

Accordingly, the present invention teaches a process for relief from supersaturation of dissolved silica in PLS. Typical PLS can contain between about 600 mg/L and about 1500 mg/L dissolved silica depending on the reactive temperatures and/or processes utilized in the metal extraction processes. This dissolved silica can create impurities in the final metal product and systemic problems in the metal extraction process by creating colloidal silica, which can agglomerate within processing equipment including, but not limited to tanks, pipes, and solvent exchange apparatus. The silica removal process of the present invention can be implemented after any reactive processing, such as by medium or high temperature pressure leaching, resulting in a PLS.

In accordance with an exemplary embodiment of the present invention, the process for providing relief from supersaturation of dissolved silica in PLS comprising: (i) providing a feed stream containing metal-bearing material; (ii) subjecting at least a portion of the metal-bearing feed stream to at least one reactive process, wherein a PLS is formed; (iii) adding acid to the PLS; (iv) adding at least one seeding agent to the PLS; (v) forming colloidal silica from dissolved silica in the PLS; (vi) adding at least one flocculant to the formed colloidal silica, such that the colloidal silica agglomerates; (vi) removing at least a portion of the agglomerated colloidal silica; and (vii) recovering metal from the remaining PLS by electrowinning.

In accordance with another exemplary embodiment of the present invention, a process for recovering metal and providing relief from supersaturation of dissolved silica in PLS comprising: (i) providing a feed stream containing metal-bearing material; (ii) subjecting at least a portion of the metal-bearing feed stream to at least one reactive process, wherein a PLS is formed; (iii) adding acid to the PLS; (iv) adding at least one seeding agent to the PLS; (v) forming colloidal silica from dissolved silica in the PLS; (vi) adding at least one flocculant to the formed colloidal silica, such that the colloidal silica agglomerates; (vii) removing at least a portion of the agglomerated colloidal silica; (viii) recovering metal from the remaining PLS by electrowinning; (ix) and providing at least a portion of the lean electrolyte from the electrowinning step to supply some or all of the acid used. In this way, the use of recycled acid-containing solution, rather than concentrated sulfuric acid, is economically advantageous.

In an exemplary embodiment illustrated by FIG. 1, after metal-bearing material 100 has been suitably prepared for reactive processing, for example, by other physical and/or chemical conditioning processes 201, optionally, controlled fine grinding, it is subjected to at least one reactive process step 202 to yield a PLS 102. By way of example, reactive process step 202 can be a high temperature or a medium temperature pressure leaching step. Preferably, pressure leaching is a pressure leaching process operating at a temperature in the range of about 140° C. to about 250° C. and more preferably in the range of about 150° C. to about 220° C. Most preferably, the pressure leaching process operates at a temperature in the range of about 150° C. to about 160° C.

Further, referring again to FIG. 1, in one aspect of an exemplary embodiment of the present invention, conditioning of a metal-bearing solution after reactive process step 202 begins by adjusting certain physical parameters in conditioning step 203. For example, as discussed in some detail herein below, after reactive processing 202 metal-bearing material 100 may undergo reagent additions, flashing processes, one or more solid-liquid phase separation steps including use of filtration systems, counter-current decantation (CCD) circuits, thickeners, clarifiers, or any other suitable device for solid-liquid separation, in conditioning step 203 to prepare the metal solubilized therein for recovery.

In accordance with further aspects of this exemplary embodiment, the slurry product 102 from the reactive process step 202, or further conditioned slurry product stream 103, may be further conditioned in preparation for later metal-value recovery steps in one or more solid-liquid phase separation steps 204 may be used to separate solubilized metal solution from solid particles. This may be accomplished in any conventional manner, including use of filtration systems, counter-current decantation (CCD) circuits, thickeners, clarifiers, and the like. A variety of factors, such as the process material balance, environmental regulations, residue composition, economic considerations, and the like, may affect the decision whether to employ a CCD circuit, a thickener, a filter, a clarifier, or any other suitable device in a solid-liquid separation apparatus. In one aspect of an exemplary embodiment of the invention, one or more solid-liquid phase separation steps 204 may be carried out with a conventional CCD utilizing conventional countercurrent washing of the residue stream to recover leached metal values to one or more solution products and to minimize the amount of soluble metal values advancing with the solid residue to further metal recovery processes or storage.

Additionally, referring again to FIG. 1, in one aspect of an exemplary embodiment of the present invention, the separated solids from one or more solid-liquid phase separation steps 204 may further be subjected to later processing steps, including secondary metal recovery, such as, for example, recovery of gold, silver, platinum group metals, molybdenum, zinc, nickel, cobalt, uranium, rhenium, rare earth metals, and the like, by sulphidation, cyanidation, or other techniques. Alternatively, the separated solids may be subject to impoundment or disposal.

Referring to FIG. 1, in an exemplary embodiment of the present invention, after PLS 104 has been suitably conditioned in 203 or 204 it may be forwarded to a desired metal recovery step. The metal recovery step may include any suitable conditioning and/or copper recovery method or methods, for example, electrowinning, formation, solution extraction (sometimes referred to as solvent extraction or liquid ion exchange), ion exchange, and/or ion flotation, and preferably results in a relatively pure copper product.

Further, referring again to FIG. 1, in an exemplary embodiment of the present invention, the resulting PLS 104 may be forwarded to a silica removal circuit 208. In accordance with an exemplary embodiment of the present invention as focused on the removal of silica, it is here, after the reactive processing steps 202, any optional conditioning steps 203, and/or any solid-liquid separation steps 204, when removal of dissolved or colloidal silica is most advantageous.

Moreover, under normal medium-temperature pressure leaching conditions, the dissolved silica concentration of the PLS 102 is usually in the range of 300 mg/L to 400 mg/L, a concentration that exceeds the solubility limit at room temperature. Over an extended period of time and under these conditions, the dissolved silica monomer (Si(OH)$_4$) gradually polymerizes and transforms to colloidal particles, or silica gel. This colloidal silica can be responsible for silica agglomeration and silica residue throughout the metal extraction processes. The rate of polymerization is catalyzed by hydrogen ions and fluoride ions (if any). When the dissolved silica experiences a higher acid concentration, the monomer polymerizes more quickly and precipitates as colloidal particles according to:

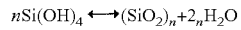

$$n\text{Si(OH)}_4 \longleftrightarrow (\text{SiO}_2)_n + 2n\text{H}_2\text{O}$$

Generally, silica polymerization is often temperature dependant. For example, reducing the temperature increases the rate of silica polymerization and vice versa.

In addition to dependence on temperature, the conversion from dissolved silica to colloidal silica is dependant on the acid concentration or pH of the PLS. Similarly, a decreased pH value will tend to give higher polymerization rates. Thus, by controlling the pH, one has an additional degree of freedom for controlling the rate of silica polymerization. For instance, increasing the pH to about 2 will result in a sharp decrease in the rate of silica polymerization.

While dissolved silica is a problem in the metal extraction process, the use of one or more solid-liquid phase separation steps are unsatisfactory to remove advantageous amounts of dissolved silica and colloidal silica from the PLS 102. This is due in part because typical metal recovery processes do not form colloidal silica by addition of a seeding agent to assist in forming colloidal silica after any conditioning steps and prior to metal recovery, preferably by electrowinning. Thus they do not remove advantageous amounts or substantially all dissolved silica, as the present invention does.

Figure 2:
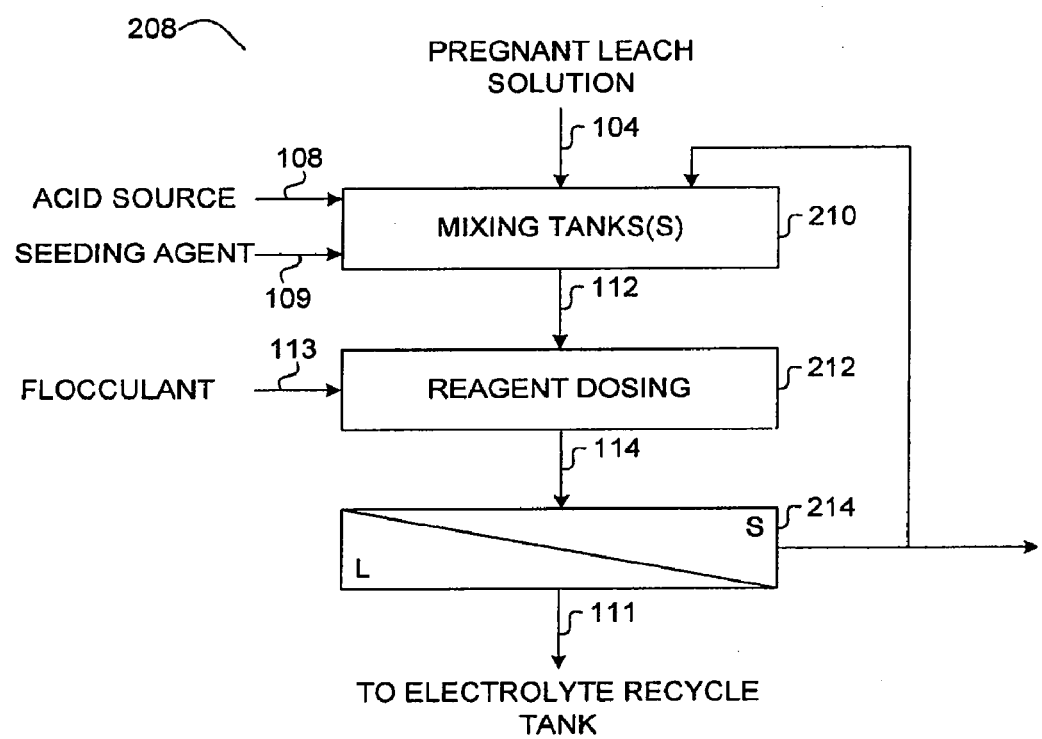
FIG. 2 illustrates an exemplary flow diagram of a silica removal circuit in accordance with one exemplary embodiment of the present invention.

Accordingly, illustrated in FIG. 2 and in accordance with an exemplary embodiment of the present invention, silica removal circuit 208 utilizes any process suitable for causing silica dissolved in a pregnant leach solution to form colloidal silica and removing the formed colloidal silica. Preferably, in accordance with an exemplary embodiment of the present invention, silica removal circuit 208 utilizes the addition of at least one seeding agent to assist in forming colloidal silica.

More specifically, again with reference to FIG. 2, in an exemplary embodiment of the present invention, silica removal circuit 208 uses a process which PLS 104 with an acid source 108, preferably lean electrolyte, to induce formation of colloidal silica that can then be collected and removed. Additionally, in an exemplary embodiment of the present invention, at least one silica seeding agent 109 is added to induce formation of colloidal silica and a solid-liquid separation process is utilized to reduce colloidal silica throughout metal recovery processes.

In an exemplary embodiment of the present invention with reference to FIG. 2, silica removal circuit 208 may comprise one or more mixing tanks 210 suitable for mixing the PLS 104 with an acid source 108 to begin forming colloidal silica.

Furthermore, in an exemplary embodiment of the present invention, silica removal circuit 208 may comprise one or more mixing tanks 210 suitable for mixing the PLS 104 with a seeding agent 109 to begin forming colloidal silica. Additionally, in an exemplary embodiment of the present invention, silica removal circuit 208 may comprise one or more solid-liquid phase separation steps 214 to collect and/or remove colloidal silica. It should be understood, as will be discussed in greater detail below, that causing dissolved silica to form colloidal silica reduces the overall concentration of colloidal silica residue and agglomeration throughout metal recovery process, thereby enabling efficient metal recovery and providing relief from supersaturation of dissolved silica in the PLS.

Figure 3:
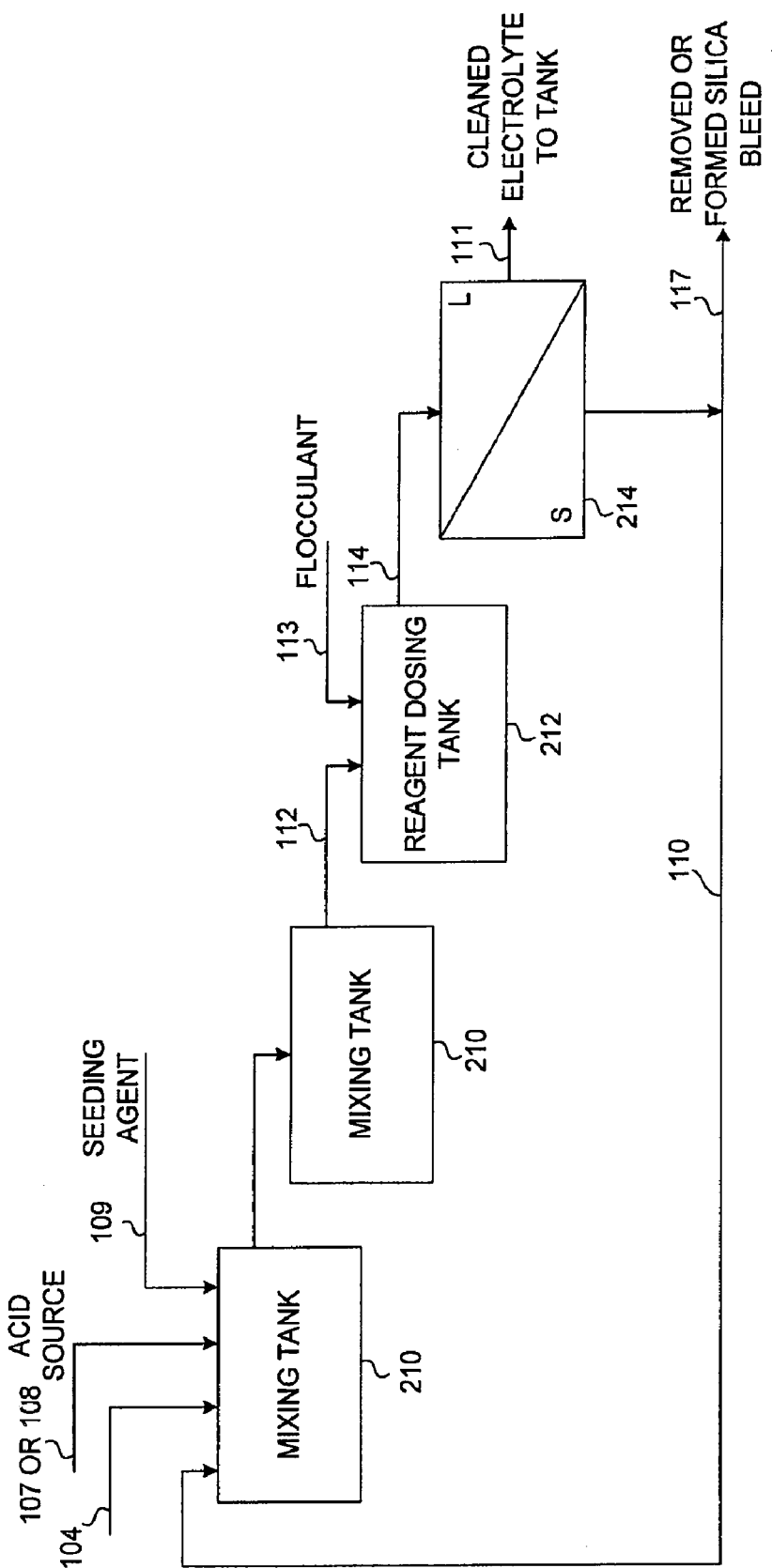
FIG. 3 illustrates an exemplary flow diagram of a serial silica removal circuit in accordance with one exemplary embodiment of the present invention.

More specifically, in an exemplary embodiment of the present invention with reference to FIG. 3 exemplifying silica removal circuit 208, colloidal silica can be formed from dissolved silica in PLS, 104, by feeding PLS 104 to one or more mixing tanks 210, adding an acid source, 107 or 108, wherein the acid source is preferably a fresh acid feed 107 and/or a lean electrolyte recycle 108 from the electrowinning step 218. In accordance with an exemplary embodiment of the present invention, the acid, 107 or 108, is added in any amount suitable to induce the formation of colloidal silica, preferably greater than about 80 g/L of acid is added. In accordance with an exemplary embodiment of the present invention, preferably 80 g/L to 180 g/L of acid is added.

In accordance with an exemplary embodiment of the present invention, the acid can be added to the PLS 104, either through the addition of concentrated $H_2SO_4$ and/or by blending PLS 104 with lean electrolyte (LE) 108. In an exemplary embodiment, the acid is supplied from LE 108 recycled from the electrolyte recycle 216 and/or electrowinning circuit 218. Moreover, in accordance with an exemplary embodiment of the present invention, any PLS 104 to LE 107 volume ratio providing a acid concentration greater than 80 g/L can be employed and are contemplated in this disclosure. Based on a 225 g/L acid concentration of LE, in accordance with an exemplary embodiment of the present invention, a 2:1 PLS 104 to LE 107 volume ratio is preferable.

Also, in an exemplary embodiment of the present invention with reference to FIG. 3, contemporaneous with or after the addition of acid, 107 and/or 108, to PLS 104 at least one seeding agent, 109 and/or 110, may be added, wherein the seeding agent is preferably a seeding agent supplied by an external feed 109 and/or provided by a seeding agent recycle from one or more solid-liquid phase separation steps 214.

Regarding the seeding agent, in accordance with an exemplary embodiment of the present invention illustrated in FIG. 3, at least one seeding agent, 109 and/or 110, is added into one or more mixing tanks 210 to increase the rate of soluble silica transformation to the colloidal state. Preferably, in one exemplary embodiment of the present invention, the concentration of the seeding agent added is 16 g/L or higher. Most preferably, in one exemplary embodiment of the present invention, the concentration of the seeding agent added is 30 g/L or higher.

In accordance with an exemplary embodiment of the present invention illustrated in FIG. 3, at least one seeding agent, 109 and/or 110, can be provided from silica precipitates collected anywhere in the metal recovery process (i.e. the electrowinning circuit 218—not shown), or by providing external seeding agents 109 into the metal recovery process. For example, in an exemplary embodiment of the present invention, seeding agents, 109 and/or 110, can be any silica based seeding agents including, but not limited to fumed silica, polyethylene oxide (PEO)-silica agglomerates, and/or a silica agglomerates formed by treating colloidal silica rich PLS with Galactosol 40HD4CD (from Hercules, Inc.), guar gum, and Ciba 7689 (from Cytec Corporation).

For example, in an exemplary embodiment of the present invention, at 5% fumed silica and greater than 80 g/L acid, about 60-80% relief of silica supersaturation was achieved within a 4 to 6 hour retention time. After 24 hours, the extent of supersaturation relief was 80-90%, indicating that the bulk of the silica polymerization takes place within a 6 hour residence time.

Similarly, in accordance with an exemplary embodiment of the present invention, the PEO-silica agglomerates were very effective in promoting supersaturation relief, with faster polymerization at higher seed loadings. The concentration of PEO-silica agglomerates ranged from 4-40 g/L (dry weight). The kinetics of the supersaturation relief process was fast in the presence of excess acid (greater than 80 g/L acid). Between 80 and 90% relief of supersaturation was attained within a 6 hour retention time. After a 24 hour retention time, the extent of supersaturation relief was 98-99%; thus, the bulk of the silica polymerization takes place within a 6 hour residence time.

Additionally, in accordance with an exemplary embodiment of the present invention, silica agglomerates formed by treating colloidal silica rich PLS with 30 mg/L Galactosol 40HD4CD and 10 mg/L Ciba 7689 resulted in similar kinetics when added as seed material. In a 6 hour residence time, about 80% of the supersaturated silica was relieved from solution; in a 24 hour residence time, 95% of the excess soluble silica was removed from solution by the seed material, again indicating that the bulk of the polymerization chemistry takes place within a 6 hour residence time at an operating temperature of 50° C. Additionally, the rate of supersaturation relief was found to be independent of temperature within the 25-80° C. range.

In accordance with an exemplary embodiment of the present invention illustrated in FIG. 3, the seeding agent can be repeatedly recycled from different parts of the metal extraction process, wherever colloidal silica is formed. For example, in one embodiment of the present invention, the seeding agent can be recycled from the solid-liquid separation process, 214 (with reference to FIG. 2, FIG. 3, and FIG. 4) and/or the electrowinning effluent 108 (with reference to FIG. 1).

In an exemplary embodiment of the invention with reference to FIG. 2 and FIG. 3, the PLS 104, acid, 107 and/or 108, and at least one seeding agent, 109 and/or 110, are fed into one or more mixing tanks 210. This mixture is then mixed and/or stored for a predetermined amount of residence time to induce further nucleation and formation of colloidal silica. In accordance with one embodiment, this mixture can be transferred between multiple mixing tanks 210 in series or parallel for additional mixing and residence time to induce further nucleation and formation of colloidal silica. Furthermore, in accordance with another exemplary embodiment of the present invention, after the acid, 107 and/or 108, and at least one seeding agent, 109 and/or 110, are mixed with the PLS 104 and colloidal silica is formed, the colloidal silica slurry 112 may be forwarded to one or more reagent dosing tanks 212 and a flocculant 113 may be added. In accordance with another exemplary embodiment of the present invention, flocculant 113 may any substance that promotes flocculation by causing silica colloids and/or other silica particles in the colloidal silica slurry 112 to aggregate, or form floccules.

For example, in accordance with another exemplary embodiment of the present invention, flocculant 113 may comprise any multivalent cation, including but not limited to any aluminum, iron, calcium, and/or magnesium, or any polymer, including but not limited to polyacrylamides, compound suitable for promoting flocculation of colloidal silica. Furthermore, in accordance with another exemplary embodiment of the present invention, flocculant 113 may comprise at least one of polyethylene oxide (PEO), Galactosol 40HD4CD, guar gum, Ciba 7689, and Scifloc C2733.

After sufficient colloidal silica has been formed and agglomerated by the flocculant 113 in reagent dosing tank 212, in accordance with another exemplary embodiment of the present invention, the flocculated slurry 114 may be forwarded to one or more solid/liquid separation steps 214 to remove advantageous amounts of colloidal silica. As mentioned, one or more solid-liquid phase separation steps 214 may be used to separate flocculated colloidal silica and to form metal-rich solution 111 prepared for metal recovery processes. This solid-liquid phase separation may be accomplished in any conventional manner, including use of filtration systems, counter-current decantation (CCD) circuits, thickeners, clarifiers, centrifuges, and the like. In accordance with further aspects of this preferred embodiment, solid-liquid phase separation step 214 comprises a dissolved-air flotation (DAF), pinned-bed clarification, column flotation, air-encapsulated flocculation, vibrating Sweco screening, stationary Kason screening, or Trommel screening.

In another exemplary embodiment of the present invention, the flocculated slurry 114 is fed to the solid/liquid separation step 214 at a temperature less than about 100° C. Most preferably, in another exemplary embodiment of the present invention, the flocculated slurry 114 is fed to the solid/liquid separation step 214 at a temperature greater than 25° C. and less than about 85° C., most preferably 50° C.

Preferably, in another exemplary embodiment of the present invention, between all the mixing tanks, 210, the solution is mixed continuously or intermittently for four (4) hours or more and allowed to be aged for a residence time of six (6) hours to remove an advantageous amount of silica from the metal extraction process. It should be understood that numerous variations on mixing times and aging or residence times are contemplated within this invention.

In one exemplary embodiment of the present invention, removing advantageous amounts of colloidal silica means removing more silica than would be removed in a solid/liquid separation step without the addition of a seeding agent at the same temperature, acidity, and with the same mixing and residence time.

In one exemplary embodiment of the present invention, removing advantageous amounts of colloidal silica means removing greater than about 60% of the total silica in the metal extraction process. In another exemplary embodiment of the present invention, removing advantageous amounts of colloidal silica means removing greater than about 70% of the total silica in the metal extraction process. In another exemplary embodiment of the present invention, removing advantageous amounts of colloidal silica means removing greater than about 90% of the total silica in the metal extraction process. In another exemplary embodiment of the present invention, removing advantageous amounts of colloidal silica means removing about 98% of the total silica in the metal extraction process.

Figure 4:
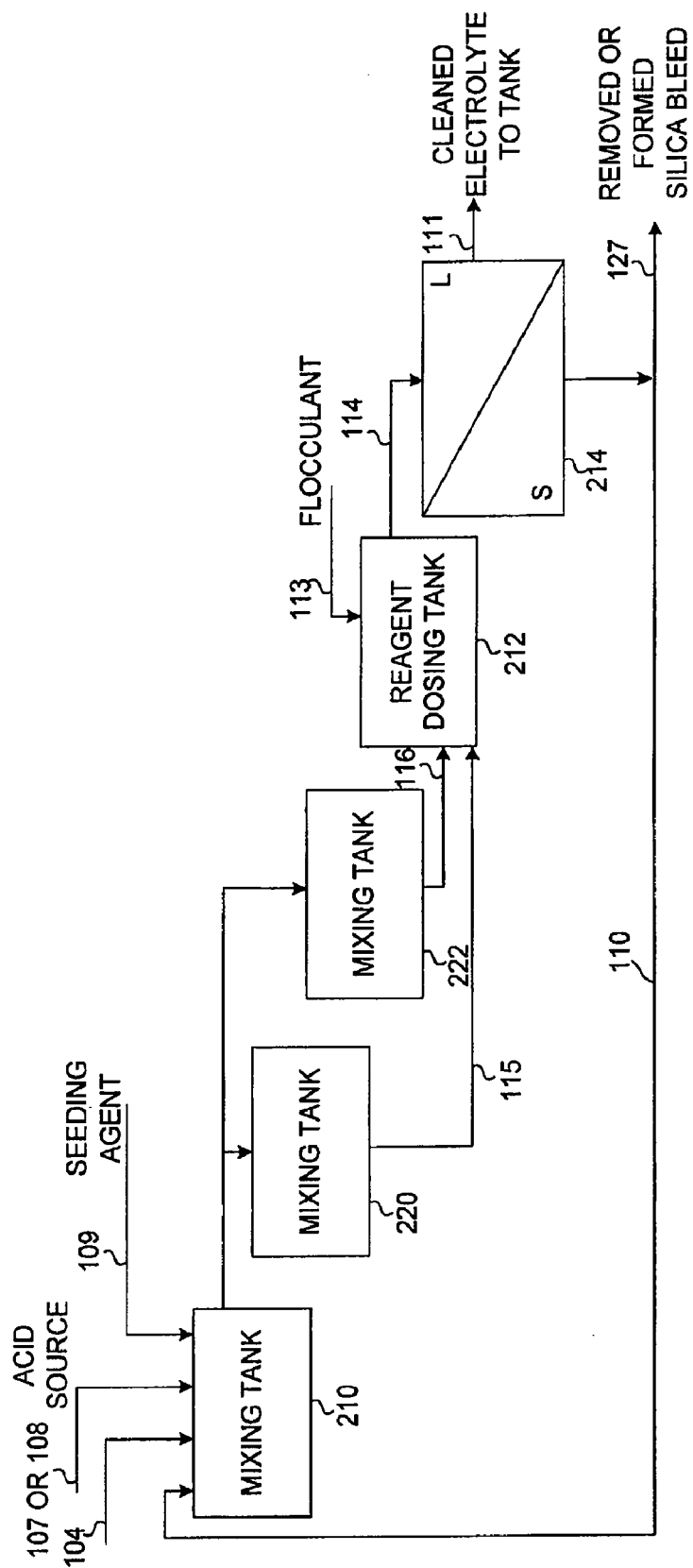
FIG. 4 illustrates an exemplary flow diagram of a parallel silica removal circuit in accordance with one exemplary embodiment of the present invention.

In an alternative exemplary embodiment with reference to FIG. 4, after the PLS 104 is mixed with acid, 107 and/or 108, and a seeding agent, 109 and/or 110, in one or more mixing tanks 210, as described above. Preferably, in accordance with another exemplary embodiment of the present invention, PLS 104 is mixed with acid, 107 and/or 108, and a seeding agent, 109 and/or 110, in two or more mixing tanks, 220 and 222, in parallel with one another. Similarly, in accordance with another exemplary embodiment of the present invention, after the acid, 107 and/or 108, and at least one seeding agent, 109 and/or 110, are mixed with the PLS 104 and the desired amount of colloidal silica is formed, the colloidal silica slurry 115 from mixing tank 220 and colloidal silica slurry 116 from mixing tank 222 may be forwarded to one or more reagent dosing tanks 212 and a flocculant 113 may be added. The two exemplary configurations described herein and depicted in the drawings are serial and parallel configurations, respectively, and numerous configurations are contemplated within the scope of this disclosure to remove dissolved silica and colloidal silica from the PLS.

With regard to FIG. 3 and FIG. 4, in an exemplary embodiment of the present invention, the flocculated slurry 114 now contains concentrated amounts of flocculated colloidal silica and substantially less dissolved silica is transferred to the solid/liquid separation step 214 to remove the colloidal silica and, thus, metal-rich solution, or rich electrolyte solution 111, is forwarded to the electrolyte recycle tank 216. Preferably, in an exemplary embodiment, the final solid-liquid separation step 214 is a thickener with most of the underflow 110 recycled to enhance formation and removal of colloidal silica. Experimental results for some of the exemplary processes are provided in the Example Section below.

In addition to the underflow or bottoms of the solid/liquid separation step 214 being recycled to one or more mixing tanks, 210, 220, and/or 222, the bottoms can be split into a residue stream, including removed colloidal silica, 117 (FIG. 3) or 127 (FIG. 4), and depending on the stream, 117 (FIG. 3) or 127 (FIG. 4), composition, may be neutralized, impounded, disposed of, or subjected to further processing, such as, for example, precious metal recovery, treatment to recover other metal values, such as, for example, recovery of gold, silver, platinum group metals, nickel, cobalt, molybdenum, zinc, rhenium, uranium, rare earth metals, and the like. Optionally, in accordance with an exemplary embodiment illustrated in FIG. 1 and FIG. 2, a portion of the residue stream, including removed colloidal silica, 117 (FIG. 3) or 127 (FIG. 4), can be recycled to other steps of the metal recovery process.

Lastly, again with reference to FIG. 1, in an exemplary embodiment, after one or more silica removal circuit 208, metal-rich solution, or rich electrolyte solution 111 is substantially free from supersaturated silica. The stream may then be sent to electrolyte recycle tank 216. Electrolyte recycle tank 216 suitably facilitates process control for electrowinning circuit 218, as will be discussed in greater detail below. Metal-containing solution stream 111, is preferably blended with a lean electrolyte stream 108 in electrolyte recycle tank 216 at a ratio suitable to yield a product stream 118, the conditions of which may be chosen to optimize the resultant product of electrowinning circuit 218. With continued reference to FIG. 1, metal from the product stream 118 is suitably electrowon to yield a pure, cathode metal product 120.

For the sake of convenience and a broad understanding of the present invention, an electrowinning circuit useful in connection with various embodiments of the invention may comprise an electrowinning circuit, constructed and configured to operate in a conventional manner. The electrowinning circuit may include electrowinning cells constructed as elongated rectangular tanks containing suspended parallel flat cathodes of metal alternating with flat anodes of lead alloy, arranged perpendicular to the long axis of the tank. A metal-bearing leach solution may be provided to the tank, for example at one end, to flow perpendicular (referring to the overall flow pattern) to the plane of the parallel anodes and cathodes, and metal can be deposited at the cathode and water electrolyzed to form oxygen and protons at the anode with the application of current. Other electrolyte distribution and flow profiles may be used.

The primary electrochemical reactions for electrowinning of metal from acid solution is believed to be as follows:

$$2CuSO_4 + 2H_2O \rightarrow 2Cu^O + 2H_2SO_4 + O_2$$

Cathode half-reaction: $Cu^{2+} + 2e^- \rightarrow Cu^O$

Anode half-reaction: $2H_2O \rightarrow 4H^+ + O_2 + 4e^-$

Turning again to FIG. 1, in a preferred embodiment of the invention, product stream 118 is directed from electrolyte recycle tank 216 to an electrowinning circuit 218, which contains one or more conventional electrowinning cells. It should be understood, however, that any method and/or apparatus currently known or hereinafter devised suitable for the electrowinning of metal from acid solution, in accordance with the above-referenced reactions or otherwise, is within the scope of the present invention.

In accordance with a preferred aspect of the invention, electrowinning circuit 218 yields a cathode metal product 120, optionally, an off gas stream (not shown), and a relatively large volume of metal-containing acid solution, herein designated as lean electrolyte stream 121. As discussed above, in the illustrated embodiment of the invention, a portion of lean electrolyte stream 121 (FIG. 1) is preferably recycled to various places in the metal extraction process including, but not limited to reactive processing step 202 and/or to electrolyte recycle tank 216. Optionally, a portion of metal-containing solution stream 111 from silica removal circuit 208 is combined with lean electrolyte recycle stream 108 and is recycled to reactive processing step 202. Moreover, in accordance with one aspect of an exemplary embodiment of the invention, a portion of lean electrolyte stream 121 (lean electrolyte bleed stream 119 in FIG. 1) is removed from the metal recovery process, exemplified in FIG. 1, for the removal of impurities and acid and/or residual metal recovery operations.

Preferably, lean electrolyte recycle stream 108 comprises at least about 50 percent by weight of lean electrolyte stream 121, more preferably from about 60 to about 95 percent by weight of lean electrolyte stream 121, and most preferably from about 80 to about 90 percent by weight of lean electrolyte stream 121. Preferably, lean electrolyte bleed stream 119 comprises less than about 50 percent by weight of lean electrolyte stream 121, more preferably from about 5 to about 40 percent by weight of lean electrolyte stream 121, and most preferably from about 10 to about 20 percent by weight of lean electrolyte stream 121.

Metal values from the metal-bearing product stream 120 are removed during electrowinning step 218 to yield a pure, cathode metal product. It should be appreciated that in accordance with the various aspects of the invention, a process wherein, upon proper conditioning of the metal-bearing solution, a high quality, uniformly-plated cathode metal product may be realized without subjecting the metal-bearing solution to solvent/solution extraction prior to entering the electrowinning circuit is within the scope of the present invention. As previously noted, careful control of the conditions of the metal-bearing solution entering an electrowinning circuit—especially maintenance of a substantially constant metal composition in the stream—can enhance the quality of the electrowon metal by, among other things, enabling even plating of metal on the cathode and avoidance of surface porosity in the cathode metal, which degrades the metal product and thus may diminish its economic value. In accordance with this aspect of the invention, such process control can be accomplished using any of a variety of techniques and equipment configurations, so long as the chosen system and/or method maintain a sufficiently constant feed stream to the electrowinning circuit. A variety of methods and apparatus are available for the electrowinning of metal and other metal values, any of which may be suitable for use in accordance with the present invention, provided the requisite process parameters for the chosen method or apparatus are satisfied.

The Example set forth hereinbelow is illustrative of various aspects of a preferred embodiment of the present invention. The process conditions and parameters reflected therein are intended to exemplify various aspects of the invention, and are not intended to limit the scope of the claimed invention.

ACID ADDITION EXAMPLES

Example 1

Aged (3-week-old) medium-temperature PLS containing 330 mg/L total Si was obtained. After 6 weeks of aging and maintaining the PLS at 50° C., the soluble silicon concentration decreased to 143 mg/L and was blended with LE. After blending with 223 g/L of acid at a 1:2.5 volume ratio and treating with 20 mg/L PEO, the soluble silicon concentration was reduced from 75 to 34 mg/L. The addition of the LE catalyzed the relief of silica supersaturation. This example indicates that concentration of acid is crucial to remove advantageous amounts of colloidal silica.

Example 2

Concentrated $H_2SO_4$ was added to fresh PLS samples and allowed to age over a three day period. Samples were taken periodically and treated with the equivalent of 20 mg/L PEO to remove colloidal silica. After 10 to 15 min at 50° C., treated samples were filtered on 0.45 µm media. Filtrates were analyzed for soluble silica (as silicon). Table 1 shows that increasing the acid concentration of the blend solution promotes removal advantageous amounts of colloidal silica.

TABLE 1

| Experiment | Acid | Soluble Si Analyses, mg/L | |
|---|---|---|---|
| ID | Addition, g/L | Day 1 | Day 3 |
| 2938-133-1 | 0 | 165 | 158 |
| 2938-136-1 | 117 | 154 | 101 |
| 2938-136-2 | 143 | 152 | 82 |
| 2938-136-3 | 182 | 149 | 75 |
| 2938-136-4 | 219 | 145 | 76 |
| 2938-136-5 | 257 | 142 | 71 |

USE OF SEEDS TO FORM COLLOIDAL SILICA EXAMPLES

Example 1

Figure 5:
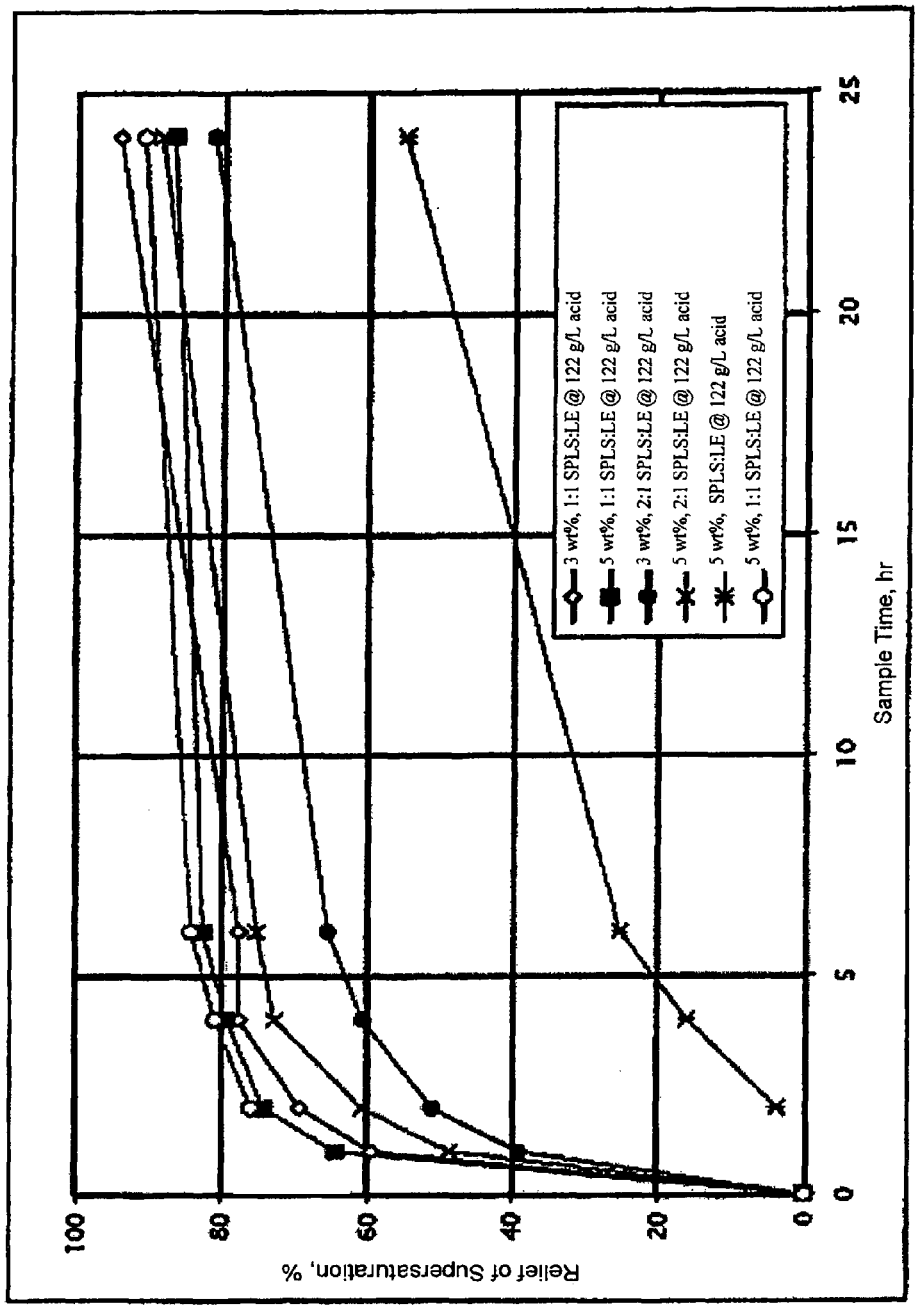
FIG. 5 illustrates exemplary lab data where fumed silica is used as the seeding agent in accordance with an exemplary embodiment of the present invention.

Samples of fresh PLS were slurried with fumed silica to promote the relief of silica supersaturation. The slurries were stirred at 50° C. over a period of time. Samples were taken at 1, 2, 4, 6, and 24 hours, filtered, and analyzed for soluble silica (as silicon). FIG. 5 shows the extent of silica supersaturation relief from PLS, with and without LE addition, when fumed silica is used as seed. The rate of the process increases with increasing solid load and/or acid concentration. Comparison with data generated show that the supersaturation relief kinetics was fast with fumed silica, most likely due to the higher specific surface area. At 5% solids loading, 60-80% relief of supersaturation was achieved in a 4- to 6-hr retention time. After a 24-hr residence time, close to 80% relief of supersaturation was achieved in the presence of LE with sufficient acid. The data shows that fumed silica can be successfully used as seed material to remove advantageous amounts of colloidal silica.

Example 2

Fresh silica agglomerates generated from 10-15 mg/L PEO treatment of colloidal silica-rich LE was recycled as seed material to relieve supersaturation of silica from fresh PLS with and without LE addition. The slurries were stirred at 50° C. over a period of time. Samples were taken at 1, 2, 4, 6, and 24 hours, filtered, and analyzed for soluble silica (as silicon). There was no further PEO treatment of the solutions.

Figure 6:
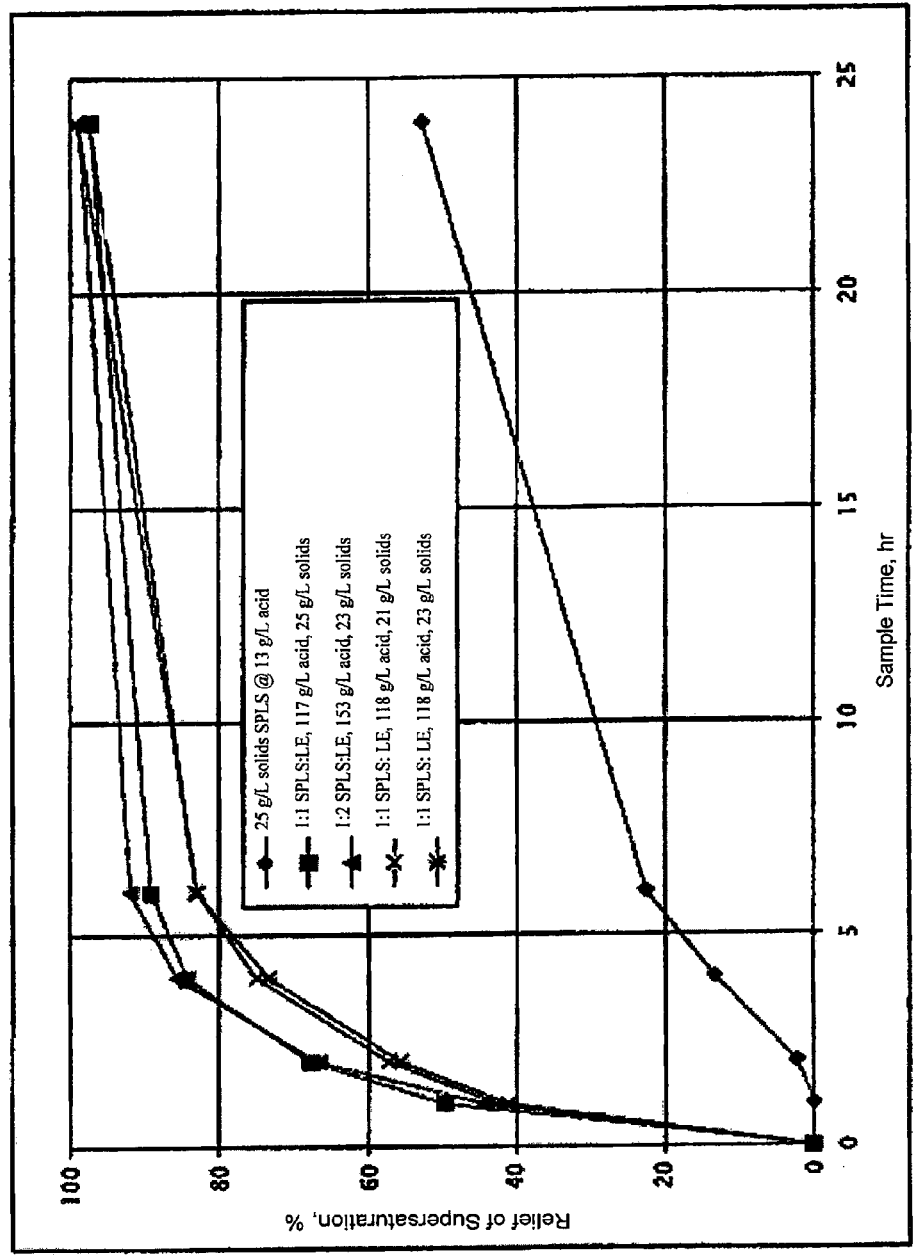
FIG. 6 illustrates exemplary lab data where polyethylene oxide (PEO)-silica agglomerates are used as the seeding agent in accordance with an exemplary embodiment of the present invention.

FIG. 6 illustrates that 80-90% relief of supersaturation was attained within a 6-hr retention time. After 24-hr contact, 98-99% relief of supersaturation was attained. The data shows that agglomerated silica from PEO treatment of LE can be recycled as seed material to fresh PLS to remove advantageous amounts of colloidal silica.

Figure 7:
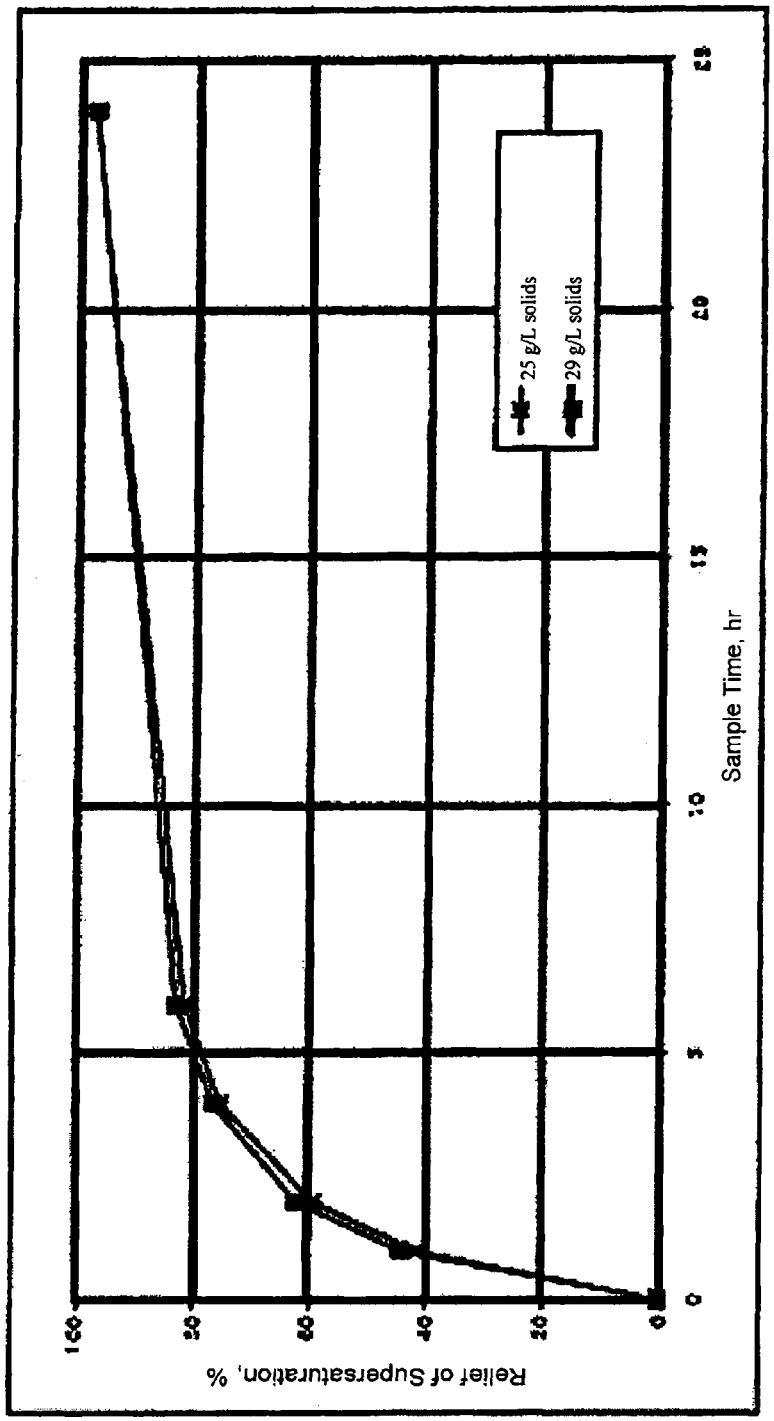
FIG. 7 illustrates exemplary lab data for Galactosol-Ciba-silica is used as the seeding agent in accordance with an exemplary embodiment of the present invention.

FIG. 7 shows the extent of supersaturation relief achieved when the recycled seed material was generated by treating colloidal silica-rich LE with a combination of 30 mg/L Galactosol 40HD4CD and 10 mg/L Ciba 7689. The data show that the silica agglomerates generated from the treatment of LE with combined Galactosol 40HD4CD and Ciba 7689 initiated soluble silica removal effects similar to those of the PEO-silica agglomerates; greater than 80% and 95% supersaturation relief was attained after 6 and 24 hours, respectively. The data generated from these experiments suggest that Galactosol and Ciba-coagulated silica agglomerates can be recycled as seed material to remove advantageous amounts of colloidal silica from a blend of fresh PLS and LE without prolonged aging of the PLS.

SOLID-LIQUID PHASE SEPARATION EXAMPLES

Example 1

A method for encapsulating air during flocculation was attempted in 16 batch scoping experiments, feed solution assaying 158 mg/L total Si, was used for these experiments. High-speed mixing created a large vortex capable of temporarily suspending fine air bubbles in solution. When flocculant was added to the stirred solution, the suspended air bubbles were trapped within the silica floccules. When agitation was stopped, the resultant floccule masses instantly rose to the top of the solution and remained stable for many hours after formation.

An initial experiment used a 1 g/L stock solution of Polyox WSR-301(PEO) at doses of 10, 20, and 30 mg/L of solution, and gave post-flocculation solution silica values of 96, 44, and 30 mg/L Si, respectively. Subsequent testing with freshly prepared 1 g/L WSR-301 solution at 10 and 20 mg/L dosages gave solution silica values of 86 and 66 mg/L Si, respectively.

Other PEO formulations used were Ucarfloc 302, 304, and 309 ("UCF"), which correspond to increasing molecular weights. Each of the formulations was tested at doses of 10 and 20 mg/L. These showed reductions in silica concentrations with increasing doses. UCF-309 gave the best results, resulting in a treated solution concentration of 38 mg/L Si after a polymer dose of 20 mg/L. This example illustrates that air-encapsulated flocculation is possible method to remove advantageous amounts of colloidal silica.

Example 2

A pilot-size stationary Kason screen with an adjustable screen angle was employed to process PEO treated LE to recover PEO-silica agglomerates. The screening was continuous and was fed with two mix tanks in series to provide an approximately 3-min retention time in each tank. A 10-mg/L PEO dose, which was effective in bench-top experiments, gave a silica concentration of 75 mg/L Si. This example illustrates that Kason screen is a possible method to remove advantageous amounts of colloidal silica.

Example 3

A continuous bench-top trommel screen was constructed to test recovery of PEO—silica agglomerates from LE.

The initial experiments showed that the liquor passing through the screen was very clear, indicating little remaining colloidal silica. This example illustrates that trommel screen is a possible method to remove advantageous amounts of colloidal silica.

Example 4

After 22 recycles, the slurry was transferred to a 1-L graduated cylinder equipped with a mechanical rake, spiked with the equivalent of 4 mg/L PEO, and subjected to a settling procedure.

The settling characteristics of the slurry are summarized in Table 2. This example illustrates that thickening is a possible method to remove advantageous amounts of colloidal silica.

TABLE 2

| Feed Slurry Solids, % | PEO Solids Dose, g/t | Settled Solids, % | Solids Overflow TSS, mg/L | Initial Settling Rate, m/hr | Thickener Capacity, m2/(t/day) |
|---|---|---|---|---|---|
| 1.8 | 190 | 13.5 | 37 | 0.7 | 4.98 |

As used herein, the terms "comprise", "comprises", "comprising", "having", "including", "includes", or any variation thereof, are intended to reference a non-exclusive inclusion, such that a process, method, article, composition or apparatus that comprises a list of elements does not include only those elements recited, but can also include other elements not expressly listed and equivalents inherently known or obvious to those of reasonable skill in the art. Other combinations and/or modifications of structures, arrangements, applications, proportions, elements, materials, or components used in the practice of the instant invention, in addition to those not specifically recited, can be varied or otherwise particularly adapted to specific environments, manufacturing specifications, design parameters or other operating requirements without departing from the scope of the instant invention and are intended to be included in this disclosure.

Moreover, unless specifically noted, it is the Applicant's intent that the words and phrases in the specification and the claims be given the commonly accepted generic meaning or an ordinary and accustomed meaning used by those of reasonable skill in the applicable arts. In the instance where these meanings differ, the words and phrases in the specification and the claims should be given the broadest possible, generic meaning. If it is intended to limit or narrow these meanings, specific, descriptive adjectives will be used. Absent the use of these specific adjectives, the words and phrases in the specification and the claims should be given the broadest possible meaning. If any other special meaning is intended for any word or phrase, the specification will clearly state and define the special meaning.

The use of the words "function", "means" or "step" in the specification or claims is not intended to invoke the provisions of 35 USC 112, Paragraph 6, to define the invention. To the contrary, if such provisions are intended to be invoked to define the invention, then the claims will specifically state the phrases "means for" or "step for" and a function, without recitation of such phrases of any material, structure, or at in support of the function. Contrastingly, the intention is NOT to invoke such provision when then claims cite a "means for" or a "step for" performing a function with recitation of any structure, material, or act in support of the function. If such provision is invoked to define the invention it is intended that the invention not be limited only to the specific structure, materials, or acts that are described in the preferred embodiments, but in addition to include any and all structures, materials, or acts that perform the claimed function, along with any and all known or later-developed equivalent materials, structures, or acts for performing the claimed function.

What is claimed is:

1. A method for providing relief from dissolved silica in pregnant leach solutions comprising:
   reacting a feed stream comprising a metal-bearing material to yield a pregnant leach solution comprising a metal-value and dissolved silica;
   adding acid and at least one seeding agent to said pregnant leach solution to yield a pregnant leach solution comprising a metal-value and colloidal silica;
   adding at least one flocculant to said pregnant leach solution comprising a metal-value and colloidal silica, such that said colloidal silica agglomerates;
   removing at least a portion of said agglomerated silica;
   recovering at least a portion of said metal-value from said pregnant leach solution.

2. The method of claim 1, wherein said reacting step comprises pressure leaching operation.

3. The method of claim 2, wherein said pressure leaching operation is operated at a temperature of from about 140° C. to about 250° C.

4. The method of claim 1, wherein said removing step comprises a solid-liquid separation step.

5. The method of claim 4, wherein said solid-liquid separation step comprises at least one of a filtration system, a counter-current decantation (CCD) circuit, a thickener, a centrifuge, a screen, a flotation method, a clarification method, and a flocculation method to remove colloidal silica.

6. The method of claim 1, wherein said at least one seeding agent comprises any silica based seed.

7. The system of claim 6, wherein the silica based seed is recycled from the electrowinning step.

8. The method of claim 1, wherein said at least one seeding agent comprises at least one of a fumed silica and a polyethylene oxide (PEO)-silica agglomerates.

9. The method of claim 1, wherein said portion of the silica removed is an advantageous amount, wherein said advantageous amount is more silica than would be removed in a solid/liquid separation step without the addition of said seeding agent and said flocculant at the same temperature, acidity, and with the same mixing and residence time.

10. The method of claim 9, wherein said advantageous amount of removed colloidal silica is greater than about 60% of the total silica in the metal extraction process.

11. A method for providing relief from dissolved silica in pregnant leach solutions comprising:
    reacting a feed stream comprising a metal-bearing material to yield a pregnant leach solution comprising dissolved silica;
    adding acid and at least one seeding agent to said pregnant leach solution to yield a pregnant leach solution comprising colloidal silica;
    adding at least one flocculant to said pregnant leach solution comprising colloidal silica, such that said colloidal silica agglomerates;
    removing at least a portion of said agglomerated silica.

12. The method of claim 11, wherein said reacting step comprises pressure leaching operation.

13. The method of claim 12, wherein said pressure leaching operation is operated at a temperature of from about 140° C. to about 250° C.

14. The method of claim 11, wherein said removing step comprises a solid-liquid separation step.

15. The method of claim 14, wherein said solid-liquid separation step comprises at least one of a filtration system, a counter-current decantation (CCD) circuit, a thickener, a centrifuge, a screen, a flotation method, a clarification method, and a flocculation method to remove colloidal silica.

16. The method of claim 11, wherein said seeding agent comprises any silica based seed.

17. The system of claim 16, wherein the silica based seed is recycled from the electrowinning step.

18. The method of claim 11, wherein said seeding agent comprises at least one of a fumed silica and a polyethylene oxide (PEO)-silica agglomerates.

19. The method of claim 11, wherein said portion of the colloidal silica removed is an advantageous amount, wherein said advantageous amount is more silica than would be removed in a solid/liquid separation step without the addition of said seeding agent and said flocculant at the same temperature, acidity, and with the same mixing and residence time.

20. The method of claim 19, wherein said advantageous amount of removed colloidal silica is greater than about 60% of the total silica in the metal extraction process.

* * * * *